2,800,410
METHOD OF TREATING CONTAINERS FOR FOOD

Albert C. Edgar, River Forest, and Hiram T. Spannuth, Chicago, Ill., assignors to Wilson & Co., Inc., a corporation of Delaware No Drawing. Original application December 17, 1954, Serial No. 476,056, now Patent No. 2,735,354, dated February 21, 1956. Divided and this application February 7, 1956, Serial No. 563,846

19 Claims. (Cl. 99—187)

This invention relates to methods for preventing the adhesion of meat and other proteinaceous meaty materials to the inner surfaces of containers therefor in which the said materials are cooked.

This application is a division of our application Serial No. 476,056, filed December 17, 1954, now Patent No. 2,735,354, granted February 21, 1956.

In the manufacture of canned meats such as luncheon meats, corned beef hash, spiced ham, potted meats, salmon and like proteinaceous meaty materials, the containers, usually metal cans, are filled with the meat, covered, and sealed. These cans are generally made of metal, suitably of sheet iron. Preferably they have been used with the interior surfaces thereof coated with tin and/or lacquer in accordance with standard procedures. After the cans are filled with the meat product they are sealed and the sealed cans are then placed in a steam retort or similar cooker, and cooked, frequently under pressure, for about one to two hours, the amount of pressure and the time of cooking depending on the kind of meat and the size of the can used.

A serious problem in the manufacture of canned meats has been the tendency of these products to adhere to the interior surfaces of the cans as a result of the cooking operation. This adhesion of meat to the can not only causes difficulty in effecting a complete removal of the contents of the can, but further results in wastage and inconvenience to the consumer who has to scrape off the adhering meat from the sides and bottom of the container. Furthermore, the appearance of the contents is frequently impaired, particularly with products such as luncheon meats which are to be removed from the can as a formed cohesive unit, because portions of the adhering surface meat are torn away during removal of the meat from the can, leaving an unsightly fragmented product, portions of which are lost to the consumer for the purpose intended.

This tendency of the meat to adhere to the interior surfaces of the can is encountered with all of the usual containers, the interior metallic or other conventional surfaces of the container having been treated or coated with lacquer, tin and the like, in accordance with conventional procedures.

The can release agents of the invention prevent the adhesion of proteinaceous meaty materials to the interior walls of the can in which the meaty materials are cooked. The compositions and compounds which may be used as can release agents in accordance with the invention are, preferably, substantially water-insoluble, solid or semi-solid synthetic materials having a melting point above about 155° F., which when deposited in a film on a surface, particularly a metal surface, forms thereon an interface of wax-like character which is preferentially adherent to the surface rather than to the contents of the can at temperatures above about 155° F., and which is non-adherent to proteinaceous meaty materials.

The can release compositions and compounds of the invention are, for all practical purposes, inert, easy and economical to manufacture and withstand, as coatings, the mechanical action of the hot and cold water washing treatments, the filling step and the processing operations in the packing plant.

In a preferred embodiment of the invention, the can release agents, which are inherently adapted to be applied as a thin fused coating or in solution in a volatile solvent on the container stock either before or after it has been formed into a container, are suspended or dissolved in a conventional can coating lacquer or enamel, applied to the container or container stock. Such lacquer or enamel may already have been used to prepare the container before packing and the can release agent applied thereover as a coating, by conventional coating procedures such as spraying, swabbing, dipping, fusion coating etc., but compounds and mixtures of compounds having melting points below 155° F., as pointed out below, when incorporated into the lacquer or enamel which is applied as the usual coating, surprisingly fulfill the requirement that the can release agent adhere preferentially to the container surface rather than to the proteinaceous material during and after the usual packing operations so that effectively these lacquer compositions contain no components which would adhere to the proteinaceous material.

The can release agents of the invention are not limited in their application to proteinaceous meaty materials such as animal protein, since they can be readily applied with advantage to marine protein materials (fish and fish products), to starchy materials which exhibit the same tendency to adhere to the sides of the container and to many other food products which are cooked in a can preliminary to sale. Nor are the can release agents of the invention limited to metal containers or cans since plastic sheet material, plastic containers, glass, paper and similar wrapping materials may be coated or covered to effectively overcome the tendency of the protein food product to adhere to the container or package, which tendency has been heretofore particularly noted after loading the uncooked or partially cooked food product into containers, sealing the containers and processing the containers under high temperature and pressure in the food processing plant even through the separately cooked food product may not cling to the wrapping material in the absence of this processing operation in the container.

The preferred compounds useful as can-release agents non-adherent to proteinaceous meaty materials are semi-solid or solid cycloimidines melting above about 155° F., preferably above about 212° F., in which an acyl from a $C_{10}$ to $C_{28}$ acid, or a mixture of such fatty acids, is modified as acylimino in a cycloimidine structure, bridged or unbridged, of the formula:

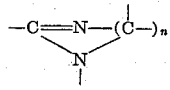

in which cycloimidine structure the intramolecular reaction of the acyl carbonyl $C=O$ with a primary amino residue of the amine reactant forms a C to N double bond in a

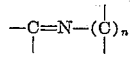

linkage which closes the cycloimidine ring about the —N—C residue of N-acyl.

The bridging of cycloimidine rings takes place through reaction with a lower aliphatic aldehyde (formaldehyde, butyraldehyde, glyoxal, or mixtures thereof).

For convenience and to facilitate the understanding of the compound structures of the can release agents in accordance with the invention, they are summarized below, exemplified specifically, and their methods of preparation are given, under the following group headings, it being understood that any one or mixtures may be used:

I. Alkyl cycloimidine compounds
II. bridged alkyl cycloimidine compounds
III. Bis cyclo compounds
IV. Aldehyde reaction products of group III.

GROUP I.—ALKYL CYCLOIMIDINE COMPOUNDS

1. *Products containing the cycloimidine ring*

These compounds are closed ring compounds which are variously referred to as glyoxalidines, imidazolines or cycloimidines having a basic ring structure as follows:

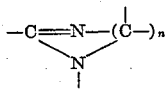

having at least one normal, alkyl group containing from $C_9$ to $C_{28}$, attached to the carbon atom adjacent the double bond and wherein $n$ is a whole number greater than 1.

In general these compounds are obtained by reacting a fatty acid and a polyamine such as ethylenediamine and splitting off water in excess of 1.5 mols for each mol of fatty acid, and under rigorous conditions the full two mols of water split off can be closely approximated. The structural formula for the preferred compounds of this class is as follows:

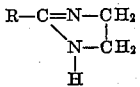

wherein R is from a fatty acid of the $C_{10}$ to $C_{28}$ series, saturated or unsaturated.

In place of ethylenediamine other polyamines can be used. Examples are, propylenediamine, diethylenetriamine, triethylene tetramine, tetraethylenepentamine dipropylene triamine, etc. Propylenediamine gives the same type structure as immediately above.

The saturated fatty acids give hard solids, the unsaturated fatty acids give stiff greases to resinous materials. They have high melting points.

2. *Cycloimidine and bridged cycloimidine compounds*

The cycloimidine compounds useful as can release agents are grouped as follows:

*a.* The reaction products of fatty acids $C_{10}$ to $C_{28}$ with an aliphatic diamine at temperatures between about 120° and 300° C. to evolve in excess of 1.5 mols of water from the mixture, for each mol of fatty acid. An example of such a product is the reaction product of 1 mol of stearic acid and 1 mol ethylenediamine having the formula:

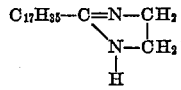

which is a solid melting at about 280° F. Cooled rapidly in a thin film it forms a continuous film, firm and hard, which is an excellent can release agent.

*b.* The reaction product of two mols of "*a*" above and 1 mol of an aldehyde such as formaldehyde produces hard wax-like compounds with the splitting off of additional water. Thus, as an example, such a compound is formed by reacting stearic acid with ethylenediamine as in "*a*" above, cooling to just above the freezing point and adding paraformaldehyde, an additional molecule of water being split off. The proportions are two mols of "*a*" above and one mol of formaldehyde. The formula of the product is:

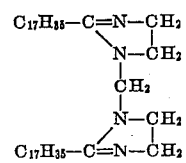

The product is a light colored, hard wax-like material, whose melting point is about 288° F.

*c.* The reaction products of fatty acids, $C_{10}$ to $C_{28}$, with a polyalkylene polyamine, examples of which are diethylene triamine, triethylene tetramine, tetraethylene pentamine. A mixture of fatty acid and amine in a mol for mol ratio is heated from 120° C. to 300° C., to remove in excess of 1.5 mols of water per mol of fatty acid, and close the cycloimidine ring.

An example of such a product is the reaction product of 1 mol of stearic acid and 1 mol of diethylenetriamine. Two cycloimidine ring formations are observed, the first being through the 1,2 nitrogen, and the second through the 1,3 nitrogen. When the reaction is carried out at atmospheric pressure in an open vessel, the cooled melt is not homogeneous; two fractions appear which can be separated. One fraction is almost white, and crystalline, and melts at about 212° F. This appears to be the 1,2 closure:

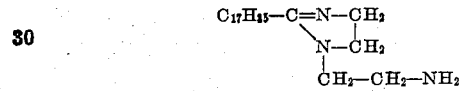

The second fraction is amorphous, off white, and melts at about 194° F. This appears to be the 1,3 closure:

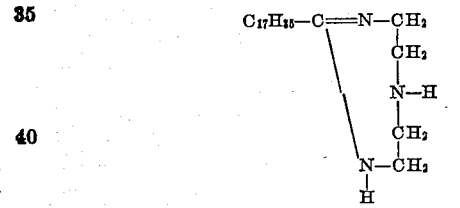

*d.* The reaction products of hydroxyalkylalkylene polyamines of the 1,2 series and at least one member of the group consisting of normal fatty acids of the $C_{10}$ to $C_{28}$ series, amides of said acids, and esters of said acids, at temperatures between about 120° C. and about 300° C., water of reaction being continuously removed from the reaction mixture during the heating, to effect the splitting out of water in excess of 1.5 mols for each mol of free fatty acid, and in excess of 0.5 mol for each mol of combined fatty acid involved.

For example, 1 mol of stearic acid reacted with 1 mol of hydroxyethyl ethylene diamine splits off two mols of water. The structural formula is as follows:

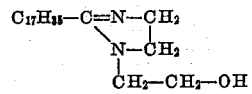

The general formula for these compounds is as follows:

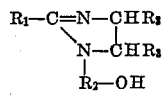

wherein $R_1$ is alkyl containing from 9 to 28 carbon atoms; $R_2$ is alkylene, amino substituted alkylene or oxy-substituted alkylene; and $R_3$ is lower alkyl or hydrogen.

GROUP II.—BRIDGED ALKYL CYCLOIMIDINE COMPOUNDS

The reaction products of group I, "*c*" above, with aldehydes, such as formaldehyde, introduce an alkylene linkage or bridge. Generally, the melting points of the methylene linked rings are usually very close or slightly higher than the melting point of the ring structure. The melting points of the aldehyde reaction products of "c" with either one or two mols of formaldehyde lie between the two fractions, ranging from about 201° F. to 205° F., which indicates that a mixture of 1,2 rings and 1,3 rings is obtained. The melting point with 2 mols of formaldehyde being on the lower side. The four structural formulas are:

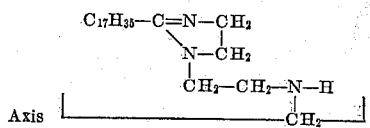

wherein 2 mols of the 1,2 ring are reacted with 1 mol of formaldehyde.

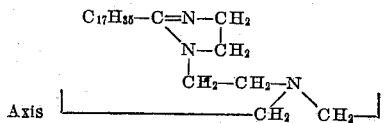

wherein 2 mols of the 1,2 ring are reacted with 2 mols of formaldehyde.

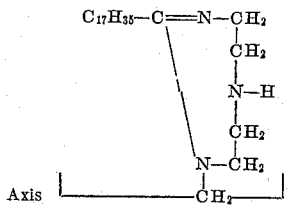

wherein 2 mols of the 1,3 ring are reacated with 1 mol of formaldehyde, and the methylene linkage occurs either at the secondary nitrogen or the tertiary nitrogen, or both.

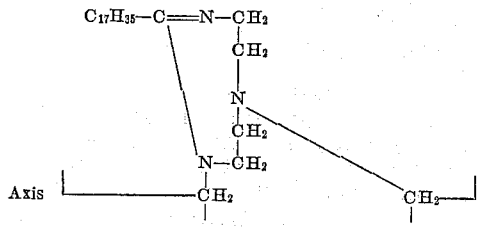

wherein 2 mols of the 1,3 ring are reacted with 2 mols of formaldehyde.

As the number of N's in the polyamines are increased, the reaction products with the fatty acid become increasingly complex, and as would be expected various mixtures are encountered. This is not only observed with respect to the reaction of the fatty acid and the polyethylene amine, but also with the further reactions with formaldehyde, wherein the complexity is still further amplified.

The polyfunctional amine structure of triethylene tetramine:

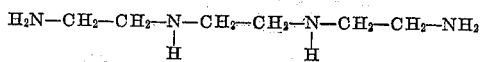

is the basis for the complexity of the derivatives, through the stages of soap, amide, and ring structure.

In the case of a simple polyamine, ethylenediamine, it is not a difficult task to obtain the bis stearoyl ethylene diamine or the ring structure by proper proportioning of the reactants.

However, as the complexity of the polyamine increases, the preparation is more difficult. In triethylenetetramine it can be observed that either of two or more possibilities exist when 2 mols of fatty acid are reacted with 1 mol of the polyamine. By reacting stearic acid through the terminal nitrogen atoms the N,N' bis-stearoyl triethylenetetramine is obtained. The ring structures are also produced through the ring closure of 1,2 nitrogen and 3,4 nitrogen. In the first instance 1 mol of water is split off for each mol of fatty acid, in the second instance 2 mols of water are split off for each mol of fatty acid.

But when stearic acid is reacted, 2 mols of fatty acid with 1 mol of ethylenediamine, a stable condition exists after 1 mol of water is removed for each mol of fatty acid, and even prolonged heating at elevated temperatures, on the order of 200° C. results in little change; if anything, decomposition or oxidation sets in. Thus, N,N' bis-stearoylethylenediamine is so stable that ring closure is not effected upon heating. However, when 2 mols of stearic acid are heated with 1 mol of triethylenetetramine, as the temperature rises, one mol of water is evolved at 200° C. and more water is progressively lost as the temperature is increased. At 200° C. the product is a light yellow colored wax-like material, melting at about 230° F. As heating progresses, water is given off more slowly.

After a total of 1.5 mols of water are lost the material is darker in color, a little less bright and melts at about 203° F. to 212° F., the melting point being less sharp. In contrast to this, continued heating of the N,N' bis-stearoylethylenediamine at moderate temperatures results in an increase in melting point, due to distillation of unsaturated components which may be present. The ring structure of stearic acid and ethylenediamine generally has a lower melting point than the bis-stearoylethylenediamine. The decrease in melting point is due to the formation of the ring structure.

Larger molecules of wax-like character are obtained when these products are further reacted with formaldehyde to introduce bridges of methylene linkages. Applicants do not wish to limit their process, therefore, to the specific examples and instances set forth in the foregoing, but rather include all of the complexes of wax-like nature and/or suitable melting points for use as can release agents.

GROUP III.—BIS CYCLO COMPOUNDS

These compositions are obtained by reacting normal fatty acids having 10 or more carbon atoms in the chain, with polyalkylene polyamines having at least four nitrogen atoms in the polyamine, and wherein two mols of acid are reacted with one mol of the polyalkylene polyamine at elevated temperatures on the order of 150° to 300° C. until 3 to 4 mols of water are driven off. These products contain the general structure:

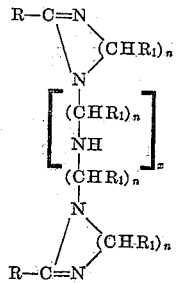

wherein:

R is a normal alkyl of at least 9 carbon atoms length.
$R_1$ is H or lower alkyl.
$n$ is a whole number greater than 1.
$x$ may be zero or a whole number.

The properties can be radically altered by reacting mixed long and short chain fatty acids with the desired amine, i. e. $C_1$ to $C_8$ fatty acids in admixture with $C_{10}$ to $C_{28}$ fatty acids, the total mol proportion of acid to amine being constant, and preferably of widely disproportionate lengths, to wit: a $C_1$ fatty acid and a $C_{10}$ fatty acid, or $C_8$ and $C_{18}$, or $C_2$ and $C_{18}$, rather than $C_8$ and $C_{10}$ fatty acids, the mixtures having the greater difference in lengths of carbon chains being preferred, and further mixtures in which the long chain fatty acids predominate are preferred.

GROUP IV.—ALDEHYDE REACTION PRODUCTS OF GROUP III

Complex structures obtained by the reaction of the bis-cycloimidine with aldehyde at temperatures from 150 to 300° C. which may be simple alkylol addition products, or complex derivatives of bis-cycloimidines and aldehydes of indeterminate structure.

Examples of bis cycloimidines and their aldehyde reaction products obtained by this procedure effective as can release agents, are:

1. Bis cycloimidine from stearic acid and tetraethylene pentamine, melting point 147°–149° F.
2. Reaction product of 1 mol of product 1 with 1 mol of formaldehyde, melting point 143°–147° F.
3. Bis cycloimidine from stearic acid and triethylene tetramine, melting point 205°–207° F.
4. Reaction product of 1 mol of product 3 with 1 mol of formaldehyde, melting point 220° F.

The compounds, compositions and mixtures of the present invention applied as can release films to the container wall for preferential adherence to the container surface rather than to the proteinaceous contents of the can are effective for release of the proteinaceous contents, when applied as a coating, in an amount of as little as 0.2 milligram per square inch of container surfaces.

The amount of material which is applied to the containers may vary from between about 0.2 to 1.0 or more mgs. of material per sq. in. of container surface, depending upon the specific product used and the meat to be packaged. In general, amounts of material in excess of 1.0 mg. per sq. in. tend to be wasteful of the material, but such amounts may be used, if desired. Less than 0.1 mg. of material per sq. in. of container surface will not ordinarily satisfactorily serve as a release agent. From 0.01 gm. to 0.10 gm. of material is usually satisfactory for the coating of an ordinary 12 oz. food can, and a preferred amount for this purpose is 0.02 to 0.05 gm.

When a can release agent product of the character described above is applied as a film uniformly over the interior surfaces of the container, the proteinaceous meaty material packed in the container falls out readily from the container when the same is inverted and there are no patches of particles adhering to the surfaces of the container. In most cases the meat falls out as an unbroken mass, thus presenting an appetizing and pleasing appearance. This was generally not the case with meat removed from cans treated in accordance with prior art procedures.

The can release agents may be incorporated in the conventional lacquer or enamel coatings which may be used for coating of the can stock. An effective amount of the can release agent in the can coating lacquer is from about 4% to about 12% by weight of the lacquer. Larger amounts tend to be wasteful of the material. Smaller amounts than 4% may be effective with certain more efficient can release agents, in the same manner as smaller amounts are effective as fusion coatings, but more uniform results are obtained at a minimum of about 4% (by weight) of agent relative to lacquer.

Better results are generally obtained when the agent is merely suspended, at room temperature, in a solvent dispersion of the conventional lacquer. However, the agent may be added at the end of the cooking and bodying operation during which the lacquer is prepared from the resin, oil and mineral spirits just before the lacquer is cooled. A larger amount (7%–18% by weight) of the agent may be added to the lacquer and heated 5–10 minutes at the lower cooking range 450–550° F. Surprisingly, can release agents melting below 155° F. can be incorporated in the lacquer in these larger amounts to provide an enameled coating of good releasing properties even though the same agents do not provide satisfactory release from the protein when used as fusion coatings.

TABLE I.—BOTTOM AND SIDE ADHESION TESTS

*Preparation.*—Cans (12 oz. uncoated Tryit) 2, 8, 9, 17 and 33 were coated with powdered agents. Can 22 was coated by spreading an excess of the agent in liquid form on the surface and allowing to drain. Cans 25 and 26 were coated with a hot benzene solution-suspension of the agents. All the coated cans were then heated in a 150° C. oven for 20 minutes. It was necessary to heat can 17 over a hot plate in order to melt and fuse the agent. The coated cans were then filled with chopped beef, sealed, and processed by the usual plant procedure for a period of 75 minutes at 230° F., and inspected.

All of the compounds tested exhibited good releasing qualities.

Results:

| Coating Compound | M. P., °F. | Can No. | Grams of wax on can | Amount of Adhesion on sides | Bottom |
|---|---|---|---|---|---|
| Stearyl acetyl cycloimidine of ethylenediamine (.25 mol stearic acid .75 mol acetic acid). | 284 | 25 | .0209 | None | None. |
| Stearyl capryl cycloimidine of ethylenediamine (.9 mol stearic acid .1 mol capric acid). | 274–282 | 2 | .0176 | ...do... | Slight. |
| Do | 274–282 | 33 | .1277 | ...do... | None. |
| Mixed C$_2$–C$_{10}$ cycloimidine (.1 mol acetic acid .9 mol capric acid). | 304–306 | 26 | .0309 | ...do... | Do. |
| C$_2$–C$_{18}$ cycloimidine (.5 mol acetic acid .5 mol stearic acid). | 275–286 | 9 | .0714 | ...do... | Do. |
| Decyl cycloimidine | 311–315 | 17 | .0326 | ...do... | Do. |
| Bis-stearoyl cycloimidine of triethylene tetramine tri-methylene. | 207–214 | 8 | .0520 | ...do... | Do. |
| Stearoyl cycloimidine of triethylene tetramine. | 173–221 | 22 | .0460 | ...do... | Do. |

*Example 1.*—One mol of stearic acid, 280 parts by weight, was reacted with one mol of diethylene triamine at 150–250° C. until 2 mols of water were driven off, to give a composition thought to be:

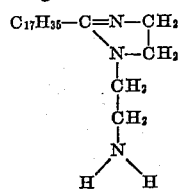

and subsequently reacted with an additional mol, 280 parts by weight, stearic acid at temperatures of 200–250° C. until 1 mol of water was removed to give a structure thought to be:

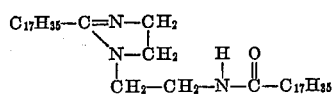

having both acyl amide and alkyl cycloimidine structures. This product was reacted with formaldehyde in ratio of 2 mols to 1 of p-formaldehyde at 150°–180° C., 1 mol of water was driven off to give the bridged product:

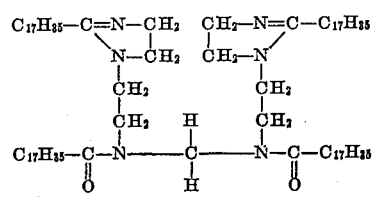

These products are satisfactory can release agents.

*Example 2.*—One mol of stearic acid, 280 parts by weight, is reacted with one mol triethylene tetramine, 146 parts by weight, at 200–250° C. until 2 mols, 36 parts, of water were removed, to form the cycloimidine

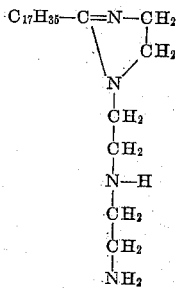

An additional mol, 280 parts, of stearic acid was added and the heating continued until an additional 18 parts, 1 mol, of water was lost, to give the product thought to be:

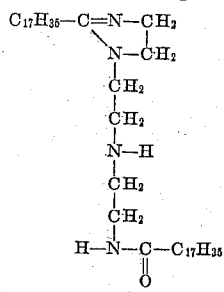

as in the preceding example. Two mols, 1104 parts, of this product were reacted with p-formaldehyde, two mols, 60 parts, at 150–180° C., until 2 mols, 36 parts, of water were lost. The addition of more p-formaldehyde resulted in formaldehyde fumes and no gain in weight indicating the bridged structure:

These products are satisfactory can release agents.

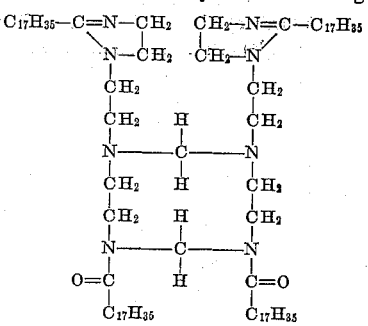

Our invention is not to be construed as limited to the methods of application described in the illustrative examples since other methods may be used, as will be evident to skilled workers in the art.

We claim:

1. The process of preventing the adhesion of food material to the inner surfaces of a container in which the food material is cooked, which comprises applying to such surfaces prior to cooking the said material in said container, a coating comprising a cycloimidine compound having therein the group

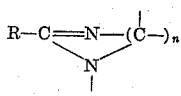

in which $n$ is a whole number greater than 1 and R is an alkyl radical having at least 9 carbon atoms, said compound having a melting point above about 155° F., and cooking the said material in said container while the same is in contact with said coating.

2. The process of preventing the adhesion of food material to the inner surfaces of a container in which the food material is cooked, which comprises applying to such surfaces prior to cooking the said material in said container, a coating comprising a waxy cycloimidine compound having therein the group

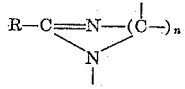

in which $n$ is a whole number greater than 1 and R is an alkyl radical having at least 9 carbon atoms, said compound having a melting point above about 155° F., and cooking the said material in said container while the same is in contact with said coating.

3. The process of preventing the adhesion of food material to the inner surfaces of a container in which the food material is cooked, which comprises applying to such surfaces prior to cooking the said material in said container, a coating comprising a waxy cycloimidine compound having therein the group

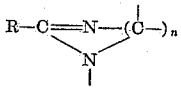

in which $n$ is a whole number greater than 1 and R is an alkyl radical derived from a $C_{10}$ to $C_{28}$ fatty acid, said compound having a melting point above about 155° F., and cooking the said material in said container while the same is in contact with said coating.

4. The process of preventing the adhesion of food material to the inner surfaces of a container in which the food material is cooked, which comprises applying to such surfaces prior to cooking the said material in said container, a coating comprising an alkylene diamine, alkylcycloimidine compound wherein the alkyl radical contains at least 9 carbon atoms, and cooking the said material in said container while the same is in contact with said coating.

5. The process of claim 4 wherein the cycloimidine compound is stearyl-acetyl cycloimidine of ethylene diamine.

6. The process of preventing the adhesion of food material to the inner surfaces of a container in which the food material is cooked, which comprises applying to such surfaces prior to cooking the said material in said container, a coating comprising a polyalkylene, polyamino, alkylcycloimidine compound wherein the alkyl radical contains at least 9 carbon atoms, and cooking the said material in said container whole the same is in contact with said coating.

7. The process of claim 6 wherein the cycloimidine compound is the stearoylcycloimidine of triethylene tetramine.

8. The process of preventing the adhesion of food material to the inner surfaces of a container in which the food material is cooked, which comprises applying to such surfaces prior to cooking the said material in said container, a coating comprising an alkylene, polyalkylcycloimidine compound wherein the alkyl radical contains at least 9 carbon atoms, and cooking the said material in said container while the same is in contact with said coating.

9. The process of claim 8 wherein the cycloimidine compound is bis-stearoylcycloimidine of triethylenetetraminetrimethylene.

10. The process of preventing the adhesion of food material to the inner surfaces of a container in which the food material is cooked, which comprises applying to such surfaces prior to cooking the said material in said container, a coating comprising an acylated, alkylcycloimidine compound, wherein the alkyl radical contains at least 9 carbon atoms, and cooking the said material in said container while the same is in contact with said coating.

11. The process of claim 10 wherein the cycloimidine compound is stearoylaminoethylene, stearylethylenediaminecycloimidine.

12. The process of preventing the adhesion of food material to the inner surfaces of a container in which the food material is cooked, which comprises applying to such surfaces prior to cooking the said material in said container, a coating comprising an alkylene, polyacylated alkylcycloimidine compound wherein the alkyl radical contains at least 9 carbon atoms, and cooking the said material in said container while the same is in contact with said coating.

13. The process of claim 12 wherein the cycloimidine compound is dimethylene, bis-stearoyldiaminodiethylene, stearyl, ethylene diamine cycloimidine.

14. In the process of preventing the adhesion of food material to the inner surfaces of a container in which the food material is cooked, the step comprising applying to such surfaces prior to cooking the said material in said container, a coating comprising a cycloimidine compound having therein the group

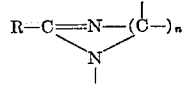

in which $n$ is a whole number greater than 1 and R is an alkyl radical having at least 9 carbon atoms, said compound having a melting point above about 155° F.

15. In the process of preventing the adhesion of food material to the inner surfaces of a container in which the food material is cooked, the step comprising applying to such surfaces prior to cooking the said material in said container, a coating comprising a waxy cycloimidine compound having therein the group

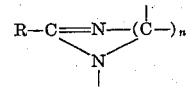

in which $n$ is a whole number greater than 1 and R is an alkyl radical having at least 9 carbon atoms, said compound having a melting point above about 155° F.

16. In the process of preventing the adhesion of food material to the inner surfaces of a container in which the food material is cooked, the step comprising applying to such surfaces prior to cooking the said material in said container, a coating comprising a waxy cycloimidine compound having therein the group

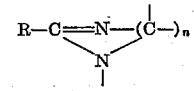

in which $n$ is a whole number greater than 1 and R is an alkyl radical derived from a $C_{10}$ to $C_{28}$ fatty acid, said compound having a melting point above about 155° F.

17. The process of preventing the adhesion of food material to the inner surfaces of a container in which the food material is cooked, which comprises applying to such surfaces prior to cooking the said material in said container, a coating comprising a synthetic nitrogen-containing product derived from normal $C_{10}$ to $C_{28}$ fatty acids and amines selected from the class consisting of alkylene diamines and polyalkylene polyamines, said product having a melting point above about 155° F. and being characterized by containing both a normal acylamino residue and a cycloimidine ring in the same molecule.

18. In the process of preventing the adhesion of food material to the inner surfaces of a container in which the food material is cooked, the step comprising applying to such surfaces prior to cooking the said material in said container, a coating comprising stearyl cycloimidine of ethylene diamine.

19. The process of preventing the adhesion of food material to the inner surfaces of a container in which said food material is cooked, which comprises applying to such surfaces prior to cooking the said material in said container, a coating comprising a nitrogen-containing product derived from $C_{10}$ to $C_{28}$ fatty acids and amines selected from the class consisting of alkylene diamines and polyalkylene polyamines, said product having a melting point above about 155° F. and being characterized by a plurality of alkyl-cycloimidine rings in the structure.

References Cited in the file of this patent

UNITED STATES PATENTS

| | | |
|---|---|---|
| 2,098,538 | Charch et al. | Nov. 9, 1937 |
| 2,124,823 | Kronquest | July 26, 1938 |
| 2,185,031 | MacLaren et al. | Dec. 26, 1939 |
| 2,380,043 | Hochwalt | July 10, 1945 |
| 2,393,202 | Stegemeyer | Jan. 15, 1946 |
| 2,413,093 | Warth et al. | Dec. 24, 1946 |
| 2,647,125 | Gunderson | July 28, 1953 |